C. REMHOF.
Tray.

No. 229,467.  Patented June 29, 1880.

Witnesses
Otto Hufeland
William Miller

Inventor
Charles Remhof
by
Van Santvoord & Hauff
his attorneys

UNITED STATES PATENT OFFICE.

CHARLES REMHOF, OF BROOKLYN, NEW YORK.

TRAY.

SPECIFICATION forming part of Letters Patent No. 229,467, dated June 29, 1880.

Application filed January 28, 1880.

*To all whom it may concern:*

Be it known that I, CHARLES REMHOF, of Brooklyn, in the county of Kings and State of New York, have invented a new and useful Improvement in Trays, which improvement is fully set forth in the following specification, reference being had to the accompanying drawings, in which—

Figure 1:
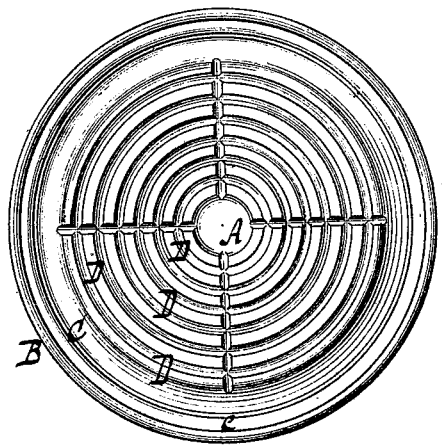
Figure 2:
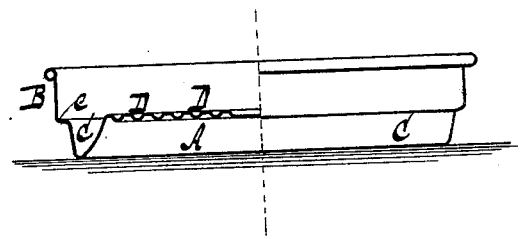

Figure 1 represents a plan or top view of my tray. Fig. 2 shows the same partly in side view and partly in section.

Similar letters indicate corresponding parts.

My invention is especially adapted to trays or waiters for carrying glasses filled with beer or other liquid; and it consists in a sheet-metal tray the bottom of which has an outer sunken trough or gutter continuous and parallel with its rim and a series of inner corrugations communicating with the trough, so that while the trough constitutes a level base to the tray, any liquid running over or spilled from the glasses is received in the corrugations, and is thereby conducted to the trough, leaving a dry support for the glasses. The bottom of the tray has also a ledge or terrace between the trough and the rim of the tray, to furnish a support for the glasses on both sides of the trough.

In the drawings, the letter A designates the bottom of the tray, and B its rim, the whole being stamped out of a single piece of sheet metal. The letter C designates a trough or gutter sunken in the outer portion of the bottom, and D a series of corrugations formed in its inner part. The trough C is continuous and substantially parallel with the rim B, which, in this example, is circular, and being deeper than the corrugations B it forms a base, whereby the tray is sustained in a level position when it is placed on a table or other surface.

The corrugations D run parallel to the rim B, and also in a radial direction, as shown in Fig. 1, whereby they are made to communicate with the trough C, and it follows that any liquid finding its way into the tray immediately flows into the trough, leaving the corrugations, which constitute a support for the glasses placed in the tray, in a comparatively dry state.

It is obvious that the corrugations D can be arranged in a variety of other ways to communicate with the trough. The trough C is situated a short distance within the rim B, so that a ledge, e, is formed between the trough and the rim; and hence if either of the glasses placed in the tray is brought over the trough it is supported on both sides thereof and is not liable to tip or tilt. The ledge e is preferably made somewhat lower than the top level of the corrugations D, so that if a glass tilts over the inner edge of the trough C with a tendency to slide toward the rim B it takes its place on the ledge.

What I claim as new, and desire to secure by Letters Patent, is—

1. A sheet-metal tray the bottom of which has an outer sunken trough or gutter continuous and parallel with its rim and a series of inner corrugations communicating with the trough, substantially as and for the purpose described.

2. A sheet-metal tray the bottom of which has an outer trough or gutter continuous and parallel with its rim, also a series of inner corrugations communicating with the trough, and a ledge or terrace between the trough and the rim of the tray, substantially as and for the purpose described.

In testimony that I claim the foregoing I have hereunto set my hand and seal this 24th day of January, 1880.

CHARLES REMHOF. [L. S.]

Witnesses:
E. F. KASTENHUBER,
J. VAN SANTVOORD.